United States Patent
Bell

(10) Patent No.: US 6,725,059 B1
(45) Date of Patent: Apr. 20, 2004

(54) SYSTEM AND METHOD FOR IMPROVING COMMUNICATIONS BETWEEN A DIGITAL LOOP CARRIER AND A CENTRAL OFFICE

(75) Inventor: Russell W. Bell, Freehold, NJ (US)

(73) Assignee: Globespanvirata, Inc., Red Bank, NJ (US)

( * ) Notice: Subject to any disclaimer, the term of this patent is extended or adjusted under 35 U.S.C. 154(b) by 0 days.

(21) Appl. No.: 09/357,706

(22) Filed: Jul. 20, 1999

Related U.S. Application Data
(60) Provisional application No. 60/093,541, filed on Jul. 21, 1998.

(51) Int. Cl.[7] ............................................. H04Q 7/24
(52) U.S. Cl. ........................ 455/554.2; 455/426.2; 455/445
(58) Field of Search ................................. 455/403, 554, 455/11.1, 12.1, 15, 422, 426, 446, 426.2, 554.2, 445; 375/211; 370/330

(56) References Cited

U.S. PATENT DOCUMENTS

| | | | |
|---|---|---|---|
| 4,747,160 A | 5/1988 | Bossard ........................ | 455/33 |
| 5,668,610 A | 9/1997 | Bossard et al. ............. | 348/723 |
| 5,794,119 A | 8/1998 | Evans et al. ................. | 455/6.2 |
| 5,809,431 A | 9/1998 | Bustamante et al. ........ | 455/562 |
| 5,857,142 A | 1/1999 | Lin et al. ..................... | 455/5.1 |
| 5,875,396 A | 2/1999 | Stockton et al. ............ | 455/562 |
| 5,886,989 A | 3/1999 | Evans et al. ................. | 370/347 |
| 6,021,158 A * | 2/2000 | Schurr et al. ................ | 375/211 |
| 6,035,178 A * | 3/2000 | Chennakeshu et al. .... | 455/12.1 |
| 6,226,280 B1 * | 5/2001 | Roark et al. ................. | 370/330 |
| 6,243,577 B1 * | 6/2001 | Elrefaie et al. ........... | 455/15 X |

* cited by examiner

Primary Examiner—Nay Maung
Assistant Examiner—Philip J. Sobutka
(74) Attorney, Agent, or Firm—Thomas, Kayden, Horstemeyer & Risley

(57) ABSTRACT

The present invention is directed to a system and method for upgrading a telecommunication system including a central office (CO), a digital loop carrier (DLC), and a plurality of customer premises equipment (CPE). Broadly, the present invention is realized by the retrofit of a DLC to enable the DLC to communicate with a CO through high bandwidth wireless transmissions. The high bandwidth wireless transmissions accommodate much larger data throughput than previously accommodated through the copper "backhaul" of multiple T1 circuits. In accordance with one aspect of the present invention, a telecommunications system comprises a CO, a DLC, and a plurality of CPE. Each of the plurality of CPE are electrically connected to the DLC. A radio frequency (RF) interface circuit is disposed at the DLC, along with one or more DSL line cards. A first wireless transceiver disposed at the DLC, and is electrically connected to the radio frequency interface circuit. A second wireless transceiver is electrically coupled to the CO. In accordance with the invention, information is exchanged between the CO and the DLC via wireless communications between the first wireless transceiver and the second wireless transceiver.

17 Claims, 4 Drawing Sheets

SYSTEM AND METHOD FOR IMPROVING COMMUNICATIONS BETWEEN A DIGITAL LOOP CARRIER AND A CENTRAL OFFICE

CROSS-REFERENCE TO RELATED APPLICATION

The present application claims the benefit of U.S. provisional patent application, Ser. No. 60/093,541, filed Jul. 21, 1998, which is hereby incorporated by reference in its entirety.

BACKGROUND OF THE INVENTION

1. Field of the Invention

The present invention generally relates to communication systems, and more particularly, to a system and method for improving communications between a digital loop carrier (DLC) and a central office (CO).

2. Discussion of the Related Art

In recent years, telephone communication systems have expanded from traditional plain old telephone system (POTS) communications to include high-speed data communications as well. As is known, POTS communications include the transmission of voice information, as well as PSTN (public switched telephone network) modem information, control signals, and other information that is transmitted in the POTS bandwidth.

Prompted largely by the growth in Internet usage, the provision of XDSL services to customer premises has proliferated over recent years. In this regard, the descriptor "x" preceding the DSL designator is used to broadly denote a variety of DSL services, including ADSL, RADSL, HDSL, etc. As is known, xDSL transmissions are sent to customer premises over the same twisted pair cabling as POTS transmission are sent. Since XDSL transmissions are communicated in a frequency band that is separate and distinct from the POTS frequency band, transmitting both types of signals over the same cabling (even at the same time), generally is not a problem. Specifically, the POTS frequency band is defined between approximately DC and approximately 4 kHz, while xDSL frequency bands (although they vary depending upon the specific service) are generally defined by a lower cutoff frequency of approximately 26 kHz, and an upper cutoff frequency that depends upon the particular xDSL service. As will be used hereinafter, the term DSL will be used interchangeably with the term xDSL, and should be construed to generically reference any of the of the various DSL services.

As is known, DSL is an additional service the customer typically purchases from its local service provider. The local service provider typically charges an additional service charge for the provision of the service. Until recently, the additional service charges have been somewhat substantial, resulting in a general limitation of the service to business enterprises. However, the services are now becoming more affordable, and therefore in higher demand. This higher demand, however, is beginning to create problems due to the existing infrastructure. Indeed, due to the existing infrastructure of the telecommunications system, DSL services are frequently unavailable to a would-be subscriber.

To better appreciate problems associated with the current infrastructure, reference is made to FIG. 1, which is a block diagram of an existing prior art telecommunications system. The telecommunications system includes a central office 10 in communication with a plurality of customer premises 14, 16, 18, and 20 through a digital loop carrier (DLC) 12. As is known, a DLC is a telecommunications device that connects end users to a central office. Frequently, the end users connected to a central office through a DLC are usually located more than 18,000 feet away from the central office. DLCs consist of a box containing line cards that concentrate individual lines within a given area, and then send the traffic over a high speed digital connection to the CO 10. In this way, DLCs extend the reach of telecommunications services from a CO, beyond the reach of a typical local loop. DLCs are frequently used in office parks, housing developments, apartments, etc. to minimize the need to run local loops over several miles to the CO servicing area. This, in turn, minimizes the use of copper, as each of the copper wire pairs 30 can carry up to 24 digitized voice channels (up to 30 digitized voice channels in some countries outside the U.S.). Instead, local loops connect a cluster of homes or businesses to a remote terminal (the DLC), which in turn concentrates the traffic into a higher bandwidth for delivery to the CO.

The high speed digital connection 30 extending between the central office 10 and the DLC 12 typically includes a plurality of T1 (in the U.S.) lines or E1 (in Europe) lines. As is known, a T1 line operates at speeds of 1.544 Mbps, which is capable of carrying 24 voice channels. One very common configuration includes a DLC that is configured to service 96 users. Such a configuration requires four T1 circuits in order to allow all 96 users to simultaneously use the telephone system. In such a configuration, the high speed interface 30 between the DLC 12 and the central office 10 may comprise five T1 circuits. The fifth T1 circuit typically acts as a spare that may be utilized in the event of a line failure, noise, etc. The economics of utilizing five copper pairs (the T1 lines), in place of 96 copper pairs, while delivering identical service to the end user provides significant value to the telephone companies, particularly when the distances to the remote locations are lengthy.

In recent years, many installations have replaced the T1 circuits 30 extending between the central office 10 and the DLC 12 with fiber optic cables, which can provide tremendous bandwidth between the CO and the DLC. However, the cost of replacing these lines is quite expensive. Therefore, where possible, it is desired to avoid replacing the T1 lines with fiber optics.

Having described the infrastructure in a large percentage of the existing telecommunications systems, it can be appreciated that the bandwidth requirements for DSL services pose a significant problem to such a (copper/T1) system. For example, ADSL can provide downstream rates from 1.5 Mbps to 8 Mbps, and upstream rates from 64 kbps to 1.5 Mbps, over a copper wires in existing telephone systems. However, it should be readily appreciated that the existing T1 service interconnect 30 existing between central office 10 and DLC 12 cannot support the bandwidth demands of simultaneous use by multiple users at customer premises 14, 16, 18, and 20 of such DSL services. As is more particularly illustrated in FIG. 1, a customer premises 14 may include multiple telephones 22, 23 and one or more computers 21 that communicate over the same two wire pair 15 to the DLC 12. If the computer 21 is equipped with a DSL card, the frequency spectra of the communications that occur over the local loop 15 may be like that illustrated by reference numeral 25. Specifically, it may include a voice band 26 that extends from approximately dc to approximately 4 KHz. Likewise, it may include an upstream frequency band 27 that extends from 64 kbps to 1.5 kbps. It may further include a downstream frequency band 28 that extends from 1.5 Mbps to 4 Mbps. It is readily appreciated that the four or five T1 lines interconnecting the central office 10 to the DLC 12 cannot support the full bandwidth capabilities of DSL, if multiple users within the various customer premises are attempting to carry on data communications over the Internet.

This problem may be manifest in either a significant data slowdown (from the stand point of the user). Alternatively, the service provider (central office) may simply inform customers that customer premises 14, 16, 18, and 20, that DSL services are not available for their customer premises. Certainly, with the growing demand for DSL services, there is a commensurately growing need for the service provider to enable the equipment to facilitate these services for the customer.

As previously mentioned, one approach is to replace the high speed communication link 30 between the DLC 12 and the central office 10 with fiber optic cabling. However, the cost of burying cable can be significant, particularly when there are significant distances separating the central office 10 from the DLC 12. An alternative solution is to provide individual local loops extending between the central office 10 and each of the customer premises 14, 16, 18, and 20. Again, burying or otherwise extending cable between the central office and the various customer premises sites is a relatively expensive solution. Furthermore, if the distance separating the central office from the various customer premises exceeds about 18,000 feet, then most DSL services cannot be adequately administered. As is known, due to the higher frequencies involved in DSL transmissions, the signal qualities significantly degrades beyond about 18,000 feet.

Accordingly, there is a present need and desire to provide an improved telecommunications system that accommodates high-speed communications with clusters of customer premises, including those more than approximately 18,000 feet from the central office.

Accordingly, it is desired to provide a networked computer system having the single DSL connection/service benefits of the system FIG. 1, but providing greater simplicity and user-friendliness from the end-user perspective.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the objects and advantages of the present invention, the present invention is directed to a system and method for upgrading a telecommunication system including a central office (CO), a digital loop carrier (DLC), and a plurality of customer premises equipment (CPE). Broadly, the present invention is realized by the retrofit of a DLC to enable the DLC to communicate with a CO through high bandwidth wireless transmissions. The high bandwidth wireless transmissions accommodate much larger data throughput than previously accommodated through the copper "backhaul" of multiple T1 circuits.

In accordance with one aspect of the present invention, a telecommunications system comprises a CO, a DLC, and a plurality of CPE. Each of the plurality of CPE are electrically connected to the DLC. A radio frequency (RF) interface circuit is disposed at the DLC, along with one or more DSL line cards. A first wireless transceiver disposed at the DLC, and is electrically connected to the radio frequency interface circuit. A second wireless transceiver is electrically coupled to the CO. In accordance with the invention, information is exchanged between the CO and the DLC via wireless communications between the first wireless transceiver and the second wireless transceiver.

In accordance with a preferred embodiment of the present invention, the wireless transceivers communicate using a local multipoint distribution service (LMDS), operating preferably in a frequency range of approximately 27.5 GHz to 29.5 GHz. In one embodiment, the first wireless transceiver and the second wireless transceiver may be in direct communication with one another. In another embodiment, a third, and perhaps additional wireless transceivers may be interposed between the first wireless transceiver and the second wireless transceiver, whereby communications between the first wireless transceiver and the second wireless transceiver may be relayed through the third and other intervening transceivers.

In accordance with a similar, but alternative embodiment, the DLC may be disposed for wireless communication with a second DLC. The second DLC may, in turn, be disposed for communication with a CO via a fiber optic cable. In such an embodiment, a wireless transceiver need not be disposed at the central office.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1:
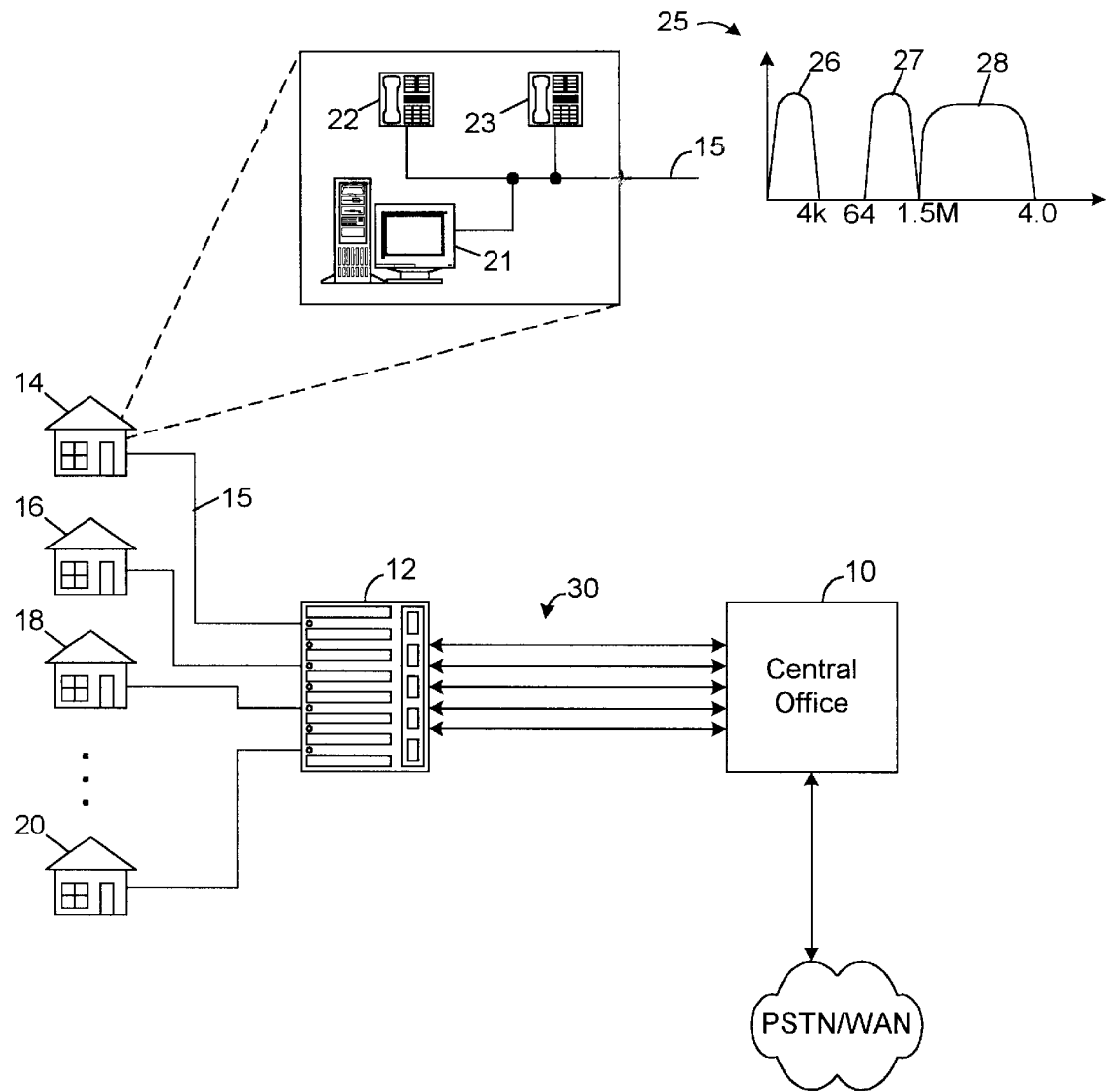
FIG. 1 is a block diagram illustrating a prior art telecommunications system having a conventional high-speed digital communication link between a central office and a digital loop carrier, utilizing multiple T1 circuits.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 2:
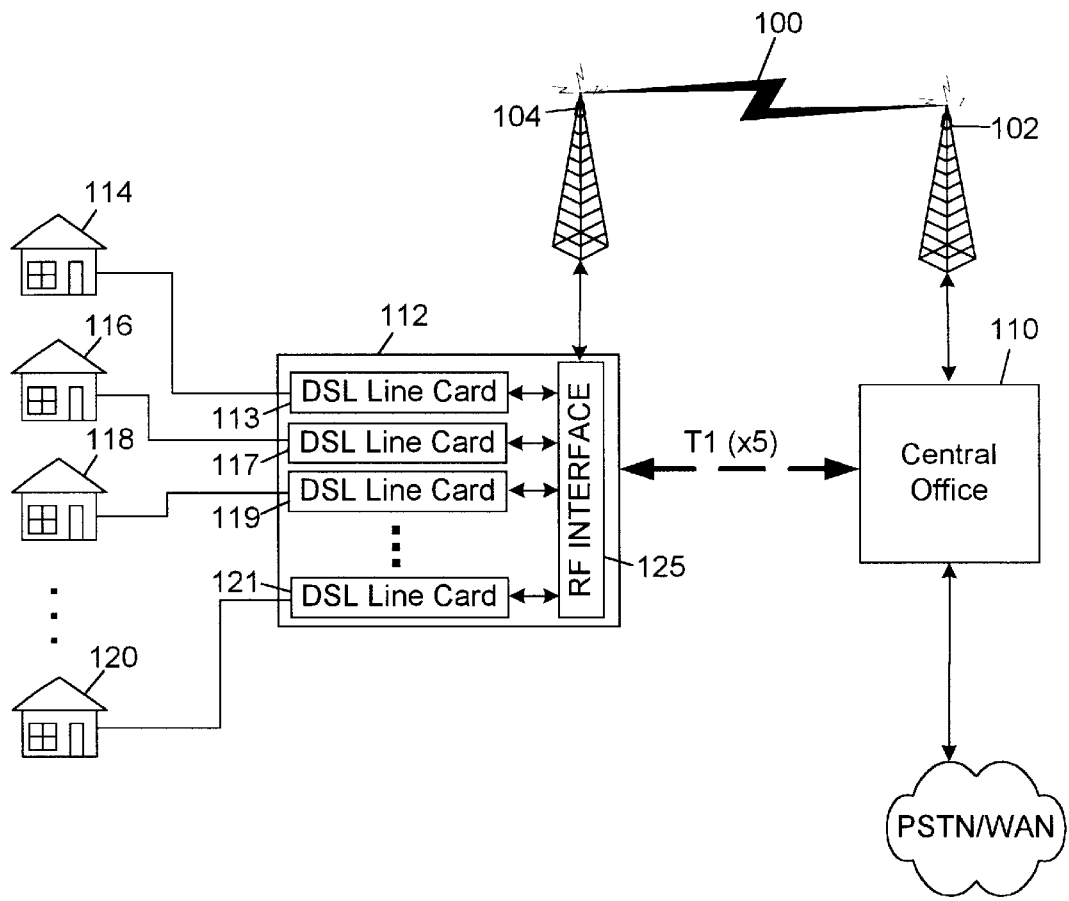
FIG. 2 is a block diagram illustrating a telecommunications system employing a wireless communication link between a digital loop carrier and a central office, in accordance with the invention.

Turning now to the drawings, reference is made to FIG. 2, which is a block diagram illustrating the principle components in a telecommunications system constructed in accordance with the present invention. Broadly, the present invention provides a telecommunications system having an improved communication link between a central office and a DLC. Specifically, this improved communication link is in the form of a high bandwidth wireless communication link 100. In accordance with the preferred embodiment, this wireless communication link is in the form of a local multipoint distribution service (LMDS). As is known, a variety of multichannel RF signal distribution systems are currently employed to deliver commercial broadcast television programming to residential consumers. These RF transmission systems are often called "wireless cable" television systems, because they can provide multichannel entertainment programming identical to conventional cable television services, but without the cost and disruption incurred in installing video cable between the program provider's studio and each customer's residence. A similar technology may be utilized in implementing the wireless communications between the central office and DLC of the present invention.

Electronic equipment suppliers in the United States have manufactured RF transmission systems to provide multichannel, multipoint distribution services (MMDS) as authorized in Title 47 of the United States Code of Federal Regulations. These MMDS systems have been installed in major metropolitan areas and are used by the television entertainment industry to augment conventional television broadcast by transmitting premium videos to residential subscribers on a fee basis (popularly referred to as pay-per-view). MMDS uses allocated spectrum at various frequencies in the 2.1 to 2.7 GHz band to transmit fourteen independent channels of video. The MMDS transmitters are installed at locations authorized by the United States Federal Communications Commission (FCC). Each of these transmitter locations has been selected so that it can broadcast into the surrounding service area without creating interference in the adjacent service areas.

Nevertheless, in responding to the need for additional wireless multipoint television distribution spectrum (i.e., in addition to the authorized MMDS spectrum) the FCC issued an operating license in the 27.5–29.5 GHz band. The technology employed for use of this spectrum has been designated as local multipoint distribution service (LMIS), and one implementation of an LMDS is disclosed in U.S. Pat. No. 4,747,160 to Bossard, which is hereby incorporated by reference in its entirety. Other LMDS systems are disclosed in the following U.S. Pat. No. 5,875,396 to Stockton et al., U.S. Pat. No. 5,809,431 to Bustamante et al., U.S. Pat. No. 5,857,142 to Lin et al., U.S. Pat. No. 5,794,119 to Evans et al., and U.S. Pat. No. 5,886,989 to Evans et al., and each of these patents are hereby incorporated by reference in their entireties.

Both LMDS and its predecessor MMDS broadcast multiple channel television signals into specified "services areas." Service areas (also referred to as "cells") identify nonoverlapping geographic regions that receive interference-free transmission from separate transmitter sites. This technology may also be employed for the high bandwidth, wireless communications of the present invention. It should be understood that similar technology, but utilizing different frequency bands, may be utilized, consistent with the scope and spirit of the present invention.

In keeping with the description of FIG. 2, a central office 110 is disposed for communication with a DLC 112 via wireless transceivers 102 and 104. Again, the communication between the wireless transceivers 102 and 104 may use LMDS, which employs directionalized (line of sight) antennas capable of OC3 rates (approximately 155 Mbps). At the DLC 112, conventional line cards may be replaced by DSL cards 113, 117, 119, and 121, to communicate with customer premises 114, 116, 118, and 120, respectively. As should be understood, the DSL line cards include conventional line interface circuitry to transmit and receive voice signals within the POTS frequency band, and which is customarily communicated by analog telephones. In addition, circuitry may be provided within the DSL cards 113, 117, 119, and 121 to communicate with DSL equipment that may be provided at that customer premises. In this regard, the circuitry provided on the DSL line cards may be equipped to handle the signal levels, frequencies, protocol, and line codes employed in DSL communications. The provisioning such electronics will be understood by persons skilled in the art, and need not be described herein in order to provide understanding of the present invention.

Also provided at the DLC 112 is an RF interface circuit 125. The RF interface circuit 125 may be disposed in communication with the various DSL line cards 113, 117, 119, and 121, and further in communication with the wireless transceiver 104. In this regard, the RF interface circuit 125 conditions digital signals received from the DSL line cards for transmission over a wireless transceiver 104. Conversely, the RF interface circuit 125 also receives analog signals received from the wireless transceiver 104 and conditions them for communication to the various DSL line cards.

A companion transceiver 102 is disposed in connection with the central office 110. Again, for purposes of disclosing the broad concepts of the present invention, the specifics of the circuitry for integrating the wireless transceiver 102 with the circuitry of the central office, need not be described herein.

It should be appreciated that the T1 services that previously connected the central office 110 to the DLC 112 may still be (optionally) utilized. That is, legacy circuitry may be included within the DLC 112 to communicate over the T1 circuits, as well as via wireless communication. In this regard, the T1 circuits provide additional bandwidths for communications between the central office 110 and the DLC 112. In addition, the T1 circuits would provide a backup link, in the event of a failure in the wireless communication link, which could continue to provide full voice services (and perhaps limited data services) while the wireless link 100 is not operational.

Figure 3:
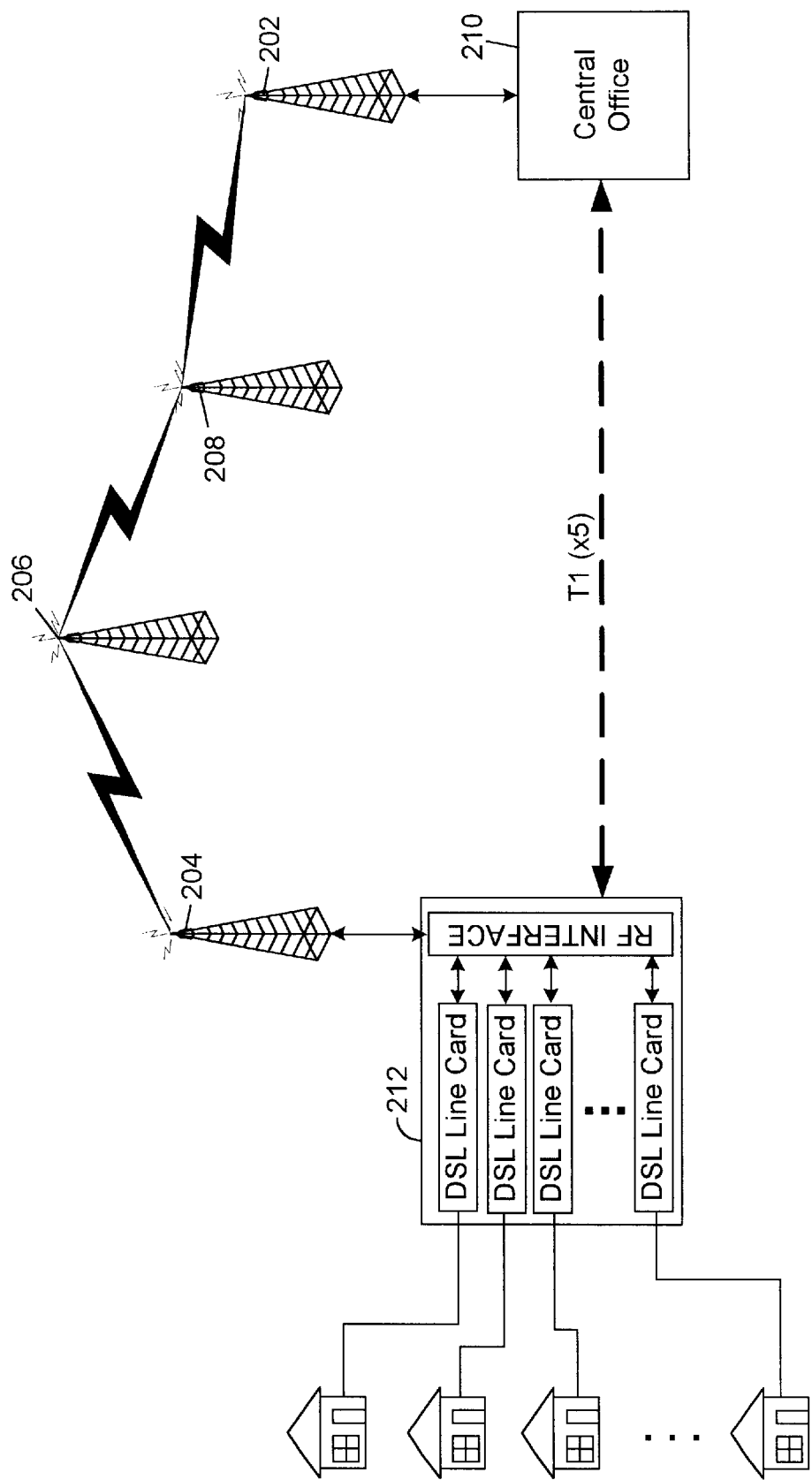
FIG. 3 is a block diagram illustrating a similar embodiment as that illustrated in FIG. 2, but further illustrating intervening wireless transceivers, that may be used to relay communications from the central office to the digital loop carrier.

Referring now to FIG. 3, an alternative embodiment of the present invention is shown. Like FIG. 2, FIG. 3 illustrates a telecommunication system having a wireless communication link between a central office 210 and a DLC 212. For purposes of discussion, the DLC 212 is similar to the DLC 112 of FIG. 2. Indeed, for purposes of illustration, all components illustrated in FIG. 3 are similar to their counterparts of FIG. 2. What is added, for purposes of this alternative embodiment, are additional wireless transceivers 206 and 208. As previously mentioned, LMDS, and many other wireless services, are directionalized transmissions, involving line of sight communication. Due to terrain and other factors (including distance) additional transceivers 206 and 208 may be interposed between transceivers 202 and 204, and provide a mechanism through which communications between the central office 210 and the DLC 212 may be relayed. Therefore, communications from the central office to the DLC may be communicated from transceiver 202 to transceiver 208, and relayed from there to transceiver 206 and finally to transceiver 204.

Figure 4:
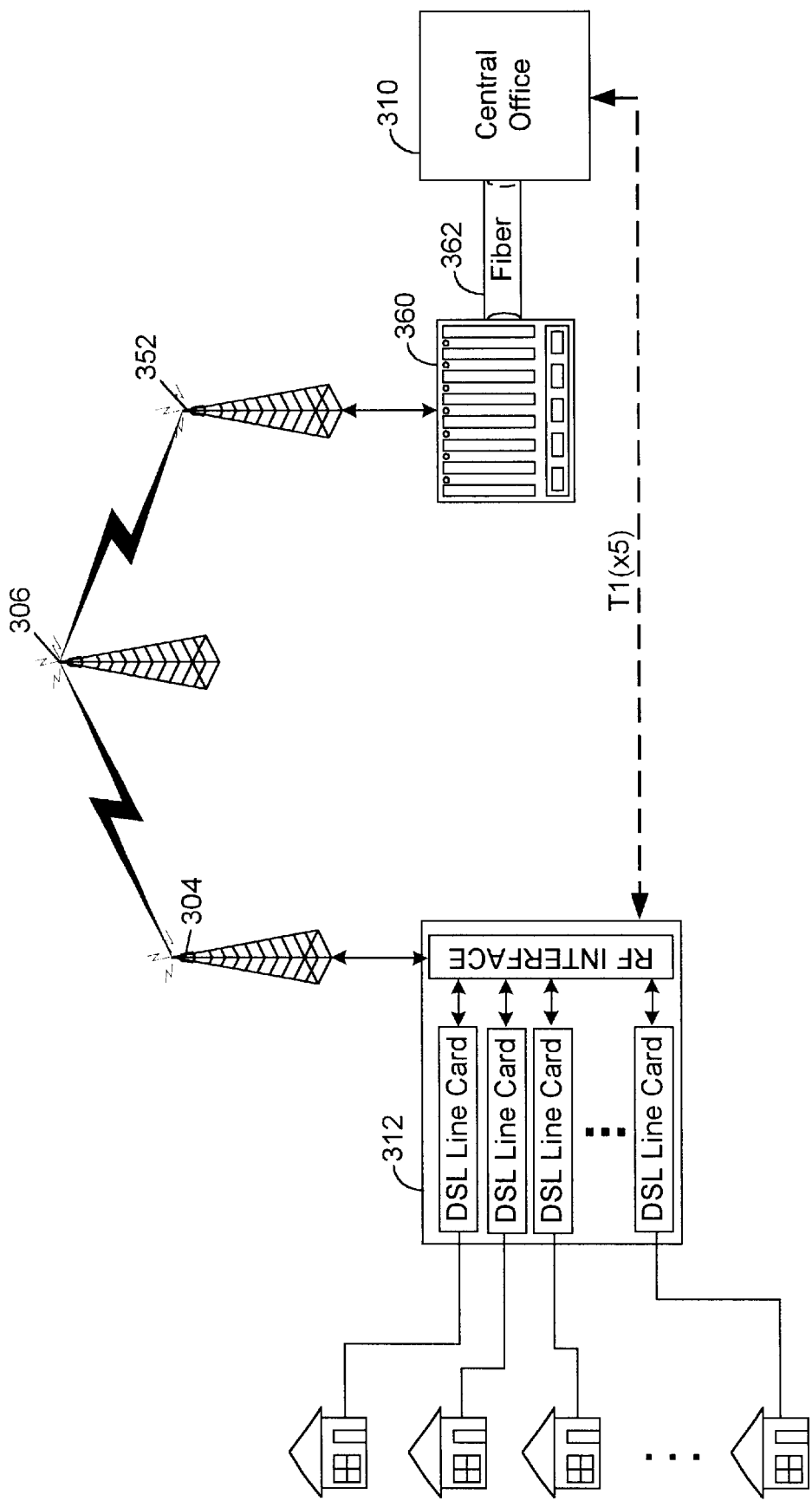
FIG. 4 is a block diagram illustrating an alternative embodiment of the present invention employing wireless communications between a first digital loop carrier and a second digital loop carrier, but employing a fiber optic cable link between the second digital loop carrier and the central office.

FIG. 4 shows yet another embodiment of a telecommunications system constructed in accordance with the present invention. In this embodiment, the central office 310 may be disposed for communication with a DLC 312 by way of multiple T1 circuits, as is conventionally known. In addition, and as described above, DLC 312 may be retrofit for wireless communication, using transceiver 304. However, rather than communicate to a wireless transceiver disposed at the central office 310, the transceiver 304 may communicate to a wireless transceiver 352 that is disposed at a second DLC 360. The wireless communication, as described in connection with FIG. 3, may optionally be relayed through additional wireless transceivers, such as transceiver 306. The second DLC 360 may be in communication with the central office 310 by way of a high bandwidth fiber optic cable 362.

The embodiment illustrated in FIG. 4 contemplates the scenario where a communication link between a central office 310 and a DLC 360 has been upgraded with a high bandwidth fiber optic cable 362, yet the communication link with other, nearby DLCs 312 have not been so upgraded. In systems such as these, it may be more economical to route the wireless communications from DLC 312 to DLC 360, and then relay communications from DLC 360 on to the central office 310, by way of the high bandwidth fiber optic cable 362.

It should be appreciated that structures such as high rise apartment buildings, and other similar structures are particularly well suited for a wireless communications system in accordance with the present invention. In this regard, higher structures are particularly well suited for the line of sight communications.

Having described the top level concepts and structure of several embodiments of a system constructed in accordance with the present invention, it should be understood by persons skilled in the art that there are a variety of radio techniques that can be used for the high bandwidth data transmission and communication. The approximately 28 GHz (LMDS) band provides bandwidths sufficient for interconnecting DLCs with high speed point of presence (POPS), the FCC has begun auctioning these bands, and bidders plan on providing high speed data and entertainment services to businesses and residences alike. By retrofitting a DLC with an LMDS antenna and transceiver, along with DSL functionality, DSL traffic could be funneled into the LMDS channel and transmitted back to a companion LMDS facility disposed at, or in communication with a central office. Alternatively, a highly directionalized antenna could be used to transmit aggregate DSL traffic from a DLC to an alternative POP (perhaps a nearby fiber optic ring) using LMDS channels. If properly engineered, the frequency planning may allow a high degree of frequency reuse, without interfering with adjacent LMDS cells. Once the aggregated traffic arrives at the POP (either the LMDS main facility, a fiber POP, or directly to the central office) the DSL traffic can be routed to the appropriate location.

As is known, LMDS transmissions are limited in range as a result of rain fade, path loss, and foliage. Consequently, there are scenarios in which higher frequency RF transports are limited to line of sight propagation. As the maximum transmitted power is limited by governmental regulations, there is a finite distance that a service provider may reach with a single transmitter or cell site. Consequently, a service provider may install additional cells to deliver RF based communications to a customer. By connecting to a copper fed, DSL enabled DLC with an RF link to high bandwidth facilities a relationship may be developed between the RF service provider and the DSL enabled DLC service provider. This may allow the extension of the RF service provider's market (using a single transmitter) by the distance covered by the DSL enabled DLC. This may result in a reduced per customer installed first cost financial position for the RF based service provider.

In this regard, the embodiment or embodiments discussed herein were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A telecommunications system comprising:
 a central office (CO);
 a digital loop carrier (DLC);
 a plurality of customer premises equipment (CPE), wherein each of the plurality of CPE are electrically connected to the DLC;
 a radio frequency (RF) interface circuit disposed at the DLC;
 a first wireless transceiver disposed at the DLC, the wireless transceiver being electrically connected to the radio frequency interface circuit; and
 a second wireless transceiver electrically coupled to the CO, whereby information is exchanged between the CO and the DLC via wireless communications between the first wireless transceiver and the second wireless transceiver.

2. The telecommunications system as defined in claim 1, wherein the wireless transceivers communicate using a local multipoint distribution service (LMDS).

3. The telecommunications system as defined in claim 2, wherein the LMDS operates in a frequency range of approximately 27.5 GHz to 29.5 GHz.

4. The telecommunications system as defined in claim 1, wherein the first wireless transceiver and the second wireless transceiver are in direct communication with one another.

5. The telecommunications system as defined in claim 1, further including a third wireless transceiver interposed between the first wireless transceiver and the second wireless transceiver.

6. The telecommunications system as defined in claim 5, wherein the first wireless transceiver is in communication with the third wireless transceiver, and the third wireless transceiver is in communication with the second wireless transceiver, whereby data exchanged between the first wireless transceiver and the second wireless transceiver is relayed through the third wireless transceiver.

7. The telecommunications system as defined in claim 5, further including additional wireless transceivers interposed between the first wireless transceiver and the third wireless transceiver.

8. A telecommunications system comprising:
 a central office (CO);
 a digital loop carrier (DLC),
 a plurality of customer premises equipment (CPE), wherein each of the plurality of CPE are electrically connected to the DLC;
 a radio frequency (RF) interface circuit disposed at the DLC;
 a first wireless transceiver disposed at the DLC, the wireless transceiver being electrically connected to the radio frequency interface circuit; and a second wireless transceiver disposed at a second DLC, and electrically coupled thereto, the second DLC being electrically coupled to the CO through a high speed interconnect, whereby information is exchanged between the CO and the DLC.

9. The telecommunications system as defined in claim 8, wherein the second DLC is electrically coupled to the CO via a fiber optic cable link.

10. The telecommunications system as defined in claim 8, wherein the wireless transceivers communicate using a local multipoint distribution service (LMDS).

11. The telecommunications system as defined in claim 8, wherein the first wireless transceiver and the second wireless transceiver are in direct communication with one another.

12. The telecommunications system as defined in claim 8, further including a third wireless transceiver interposed between the first wireless transceiver and the second wireless transceiver.

13. The telecommunications system as defined in claim 12, wherein the first wireless transceiver is in communication with the third wireless transceiver, and the third wireless transceiver is in communication with the second wireless transceiver, whereby data exchanged between the first wireless transceiver and the second wireless transceiver is relayed through the third wireless transceiver.

14. The telecommunications system as defined in claim 12, further including additional wireless transceivers interposed between the first wireless transceiver and the third wireless transceiver.

15. In a telecommunications system having a central office (CO) in communication with a plurality customer premises equipment (CPE) via a digital loop carrier (DLC), wherein the CO and DLC are connected for communication through copper wire, a method for modifying the telecommunications system to accommodate higher bandwidth communications between the CO and the CPE comprising the steps of equipping the DLC with a radio frequency interface circuit and a first wireless transceiver;

providing a second wireless transceiver in communication with the CO, wherein the second wireless transceiver is disposed for communication with the first wireless transceiver.

16. The method as defined in claim 15, further including the step of communicating between the first wireless transceiver and the second wireless transceiver using a local multipoint distribution service (LMDS).

17. The method as defined in claim 15, wherein the step of equipping the DLC further includes installing digital subscriber line (DSL) cards within the DLC.

\* \* \* \* \*